United States Patent [19]

Pepin

[11] 4,434,994

[45] Mar. 6, 1984

[54] BOOM AXLE

[76] Inventor: Julien H. Pepin, 460 Matthew St., Bristol, Conn. 06010

[21] Appl. No.: 372,619

[22] Filed: Apr. 28, 1982

[51] Int. Cl.³ .............................................. B62D 53/06

[52] U.S. Cl. .................................... 280/404; 212/189; 280/80 B

[58] Field of Search .................... 280/404, 80 B, 81 R, 280/676, 656; 212/182, 189

[56] References Cited

U.S. PATENT DOCUMENTS

| | | | |
|---|---|---|---|
| 2,433,268 | 12/1947 | Fellabaum | 280/81 R |
| 3,224,597 | 12/1965 | Whitmire | 212/182 |
| 3,747,957 | 7/1973 | Noll | 280/404 |
| 3,801,132 | 4/1974 | Haynie et al. | 280/404 |
| 3,838,868 | 10/1974 | Robertson | 280/656 |
| 4,165,005 | 8/1979 | Jokinen | 212/189 |

*Primary Examiner*—Joseph F. Peters, Jr.
*Assistant Examiner*—D. Lynn Fugate

[57] ABSTRACT

A crane boom is supported during transport such that it may pivot about a horizontal axis located forward of the terrain contacting wheels of a support assembly. The support assembly is detachably connected to the boom and has a telescoping frame which is pivotally attached to the boom adjacent its forward end.

11 Claims, 6 Drawing Figures

BOOM AXLE

BACKGROUND OF THE INVENTION (1) Field of the Invention

The present invention relates to the transport of crane booms and particularly to maintaining the movements of a boom being transported from one construction site to another within safe limits. More specifically, this invention is directed to apparatus for causing an extended boom element to move in tandem with a carrier vehicle and especially to a boom support assembly which may be detachably connected to a crane boom to provide support for the end thereof disposed away from the carrier vehicle. Accordingly, the general objects of the present invention are to provide novel and improved methods and apparatus of such character.

(2) Description of the Prior Art

There are numerous problems associated with the transportation of extended crane booms. These problems include possible damage to the pendant cables, which are used to support the boom during transport, resulting from the stresses applied thereto as a result of the bouncing action produced by uneven terrain. This bouncing action, which is probably aggravated by the springing action of the pendant cables, tends to unbalance the moving crane and may cause damage to the road surface or overhead objects. Also, there is considerable wear to the crane turntable resulting from bounce and the unbalancing of the load resulting therefrom. Further, prior art techniques of transporting a crane boom typically impose extra weight on the rear axles of the transport vehicle causing excess tire wear and wear to mechanical components. As a result of the extra weight on the rear axles, the transport vehicle is often subjected to "over-light" steering due to the unloading of the front axles thereof and this "over-light" steering may result in a dangerous lack of control. Stiff-legged transport, wherein tension is applied to the pendant cables to suspend the boom roughly parallel to the road surface, produces severe complications in negotiating corners since the boom remains straight behind the transport vehicle and thus may damage surrounding property. Also in "stiff-legged" transport, extreme stresses are imposed on the swing lock which holds the boom/crane system straight behind the carrier. All of the above problems result in the necessity of disassembling the boom and shipping it separately when regulations prohibit stiff-legged transport or where clearances preclude the use of stiff-legged transport to move the boom to the desired site.

Prior attempts to overcome the above-discussed problems are exemplified by the devices shown in U.S. Pat. Nos. 3,747,957 and 3,224,597. U.S. Pat. No. 3,747,957 discloses a trailer having a generally triangular configuration with an axle positioned at one corner and the other corners respectively being attached to the carrier vehicle and boom. The technique of U.S. Pat. No. 3,747,957 suffers the disadvantages that different size trailers must be provided for different length booms and a special trailer hitch must be provided to attach the trailer to the carrier vehicle.

U.S. Pat. No. 3,224,597 discloses a double axle support assembly which is attached to the carrier vehicle by means of a tongue. As in the case of the technique of U.S. Pat. No. 3,747,957, the carrier vehicle must be provided with a compatible trailer hitch. Further, the technique of U.S. Pat. No. 3,224,597 contemplates the interconnection of the support with the crane cab on the carrier vehicle by means of a complex arrangement of cables and thus the technique is time consuming and difficult to implement.

SUMMARY OF THE INVENTION

The present invention overcomes the above-discussed and other deficiencies and disadvantages of the prior art by providing a support assembly which may be detachably connected, by means of its forward end, to an extended boom in such a manner that the support assembly may pivot freely about a horizontal axis defined by the connection. The rearwardly disposed end of the support assembly is provided with means for absorbing shocks which result when there is relative movement between the boom and support assembly.

In accordance with the present invention a support assembly, which has at least one axle with associated wheels, is pivotally and detachably connected, at its forward end, directly to the boom. The support assembly is preferably telescoping whereby the point of connection to the boom may be displaced the appropriate distance forward of the axle or axles of the support assembly.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 5:
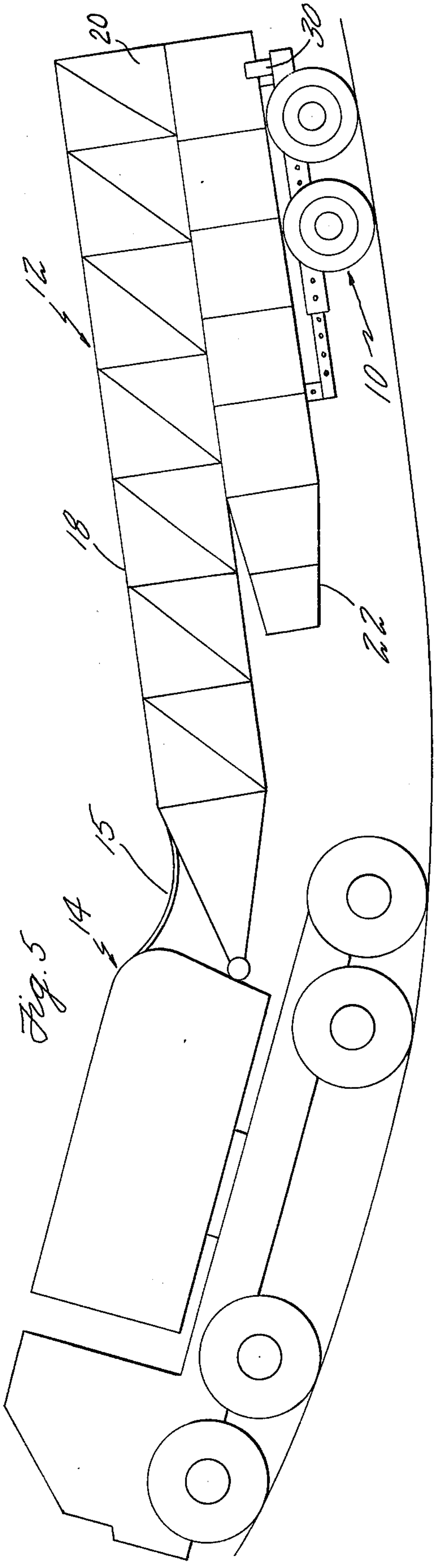
FIGS. 5 and 6 are schematic side elevation views depicting the use of the present invention.

With reference now to the drawing, a two-axle embodiment of the present invention has been shown. It is to be understood, however, that the support assembly of the present invention may be provided with one axle or two or more axles. The boom support assembly, or boom axle, is indicated generally at 10 and, in use, will be detachably secured to a crane boom which is indicated generally at 12. The boom 12 will extend outwardly from the carrier vehicle upon which is mounted the control cab and drive mechanisms, the crane and carrier vehicle being indicated generally at 14 in FIGS. 5 and 6. For purposes of illustration, boom 12 may be considered to be a ninety (90) foot boom comprised of a pair of sections 18 and 20 which are attached to one another in the conventional manner so as to permit folding of the boom to the position shown in FIGS. 5 and 6.

The boom axle 10 is supported and travels on a pair of wheel sets 28 and 28'. The wheels are supported at opposite ends of a pair of axles 42 and 42'. The axles are suspended from the frame of the carrier assembly, for example by means of semi-eliptic leaf-type springs 44 and 44'.

The boom axle 10 is essentially a frame which is of generally rectangular configuration. This frame is preferrably fabricated from steel structural shapes such as WF-beams, I-beams and/or channels.

Figure 1:
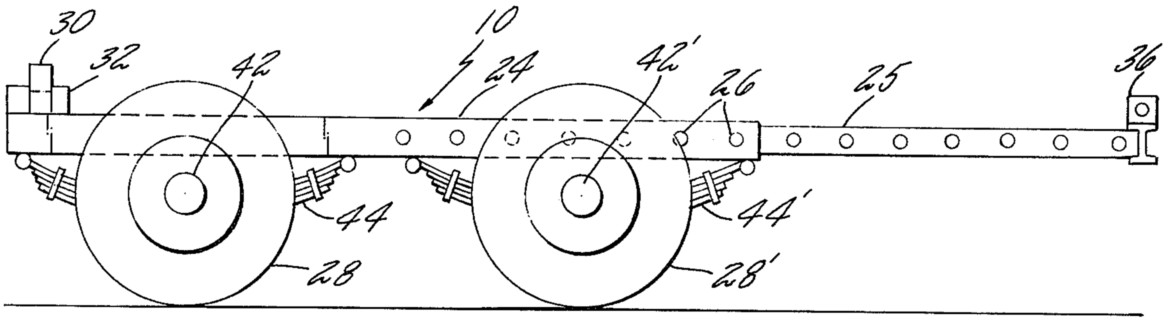
FIG. 1 is a side elevation view of a two-axle crane boom support assembly in accordance with the present invention.

As may best be seen from FIG. 1, the boom axle frame has a main body portion 24 and a forward end portion 25. End portion 25 has a telescoping relationship to body portion 24 whereby the total length of the boom axle may be adjusted. Once the appropriate length for the boom axle has been selected the amount of extension of front end portion 25 is fixed by locking pins 26 which are inserted in aligned holes in body portion 24 and end portion 25. In a typical case two pairs of locking pins will be employed.

Figure 4:
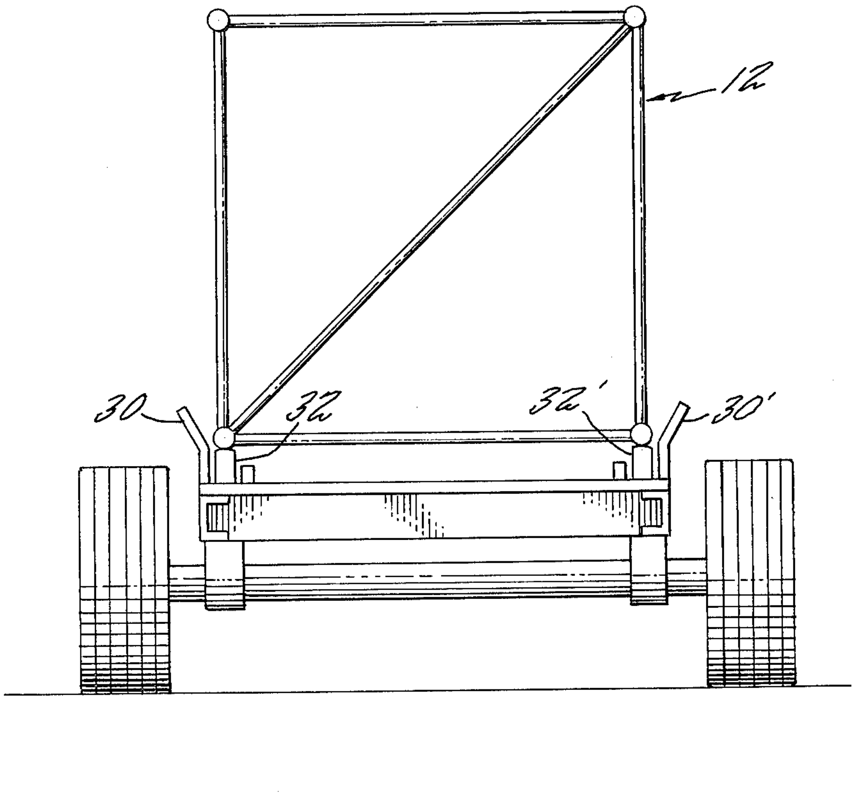
FIG. 4 is a view similar to FIG. 2 but taken from the opposite end of the assembly.
Figure 6:
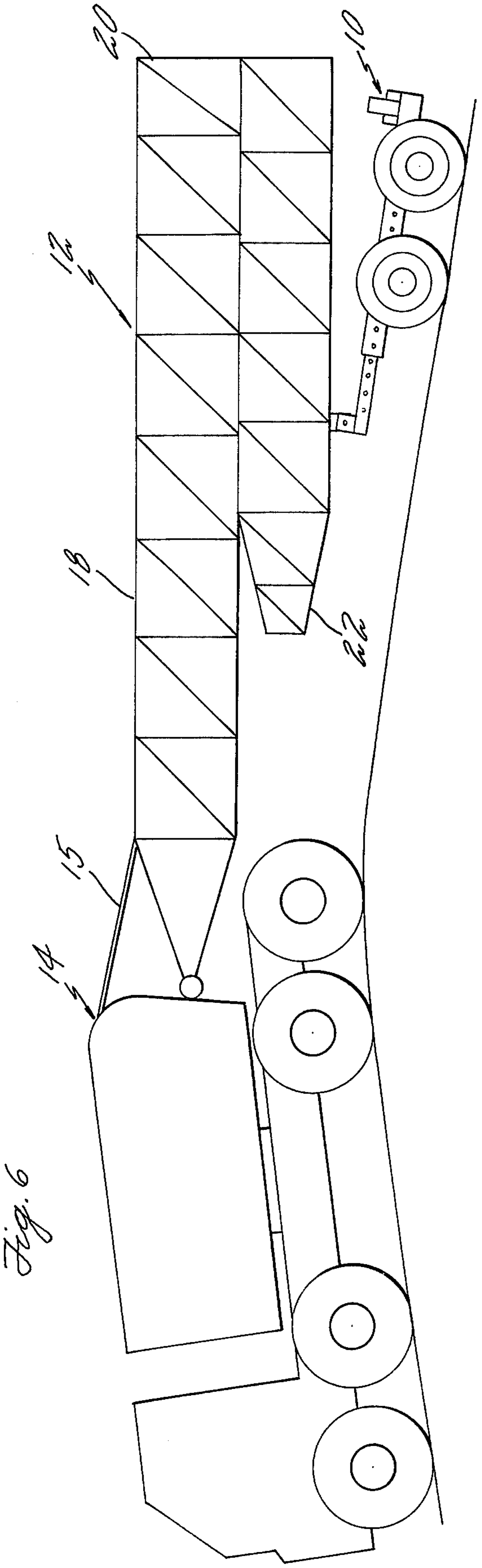

A pair of guide bars 30, 30' project upwardly from the rear end of boom axle 10, i.e., the end which will be displaced the furthest distance from the carrier vehicle 14. The guide bars 30 and 30', which can best be seen in FIG. 4, have upper portions which flare outwardly. Shock absorbing devices 32 and 32' are mounted on boom axle 10 at a point slightly inwardly with respect to respective of the guide bars 30 and 30'. The shock absorbing devices may, for example, comprise blocks of resilient material. The guide bars 30 direct the boom into contact with the shock absorbers 32. During use, should the boom raise off of the shock absorbers as is indicated in FIG. 6, upon return to level terrain the guide bars will again guide the boom back into contact with the shock absorbers.

Figure 2:
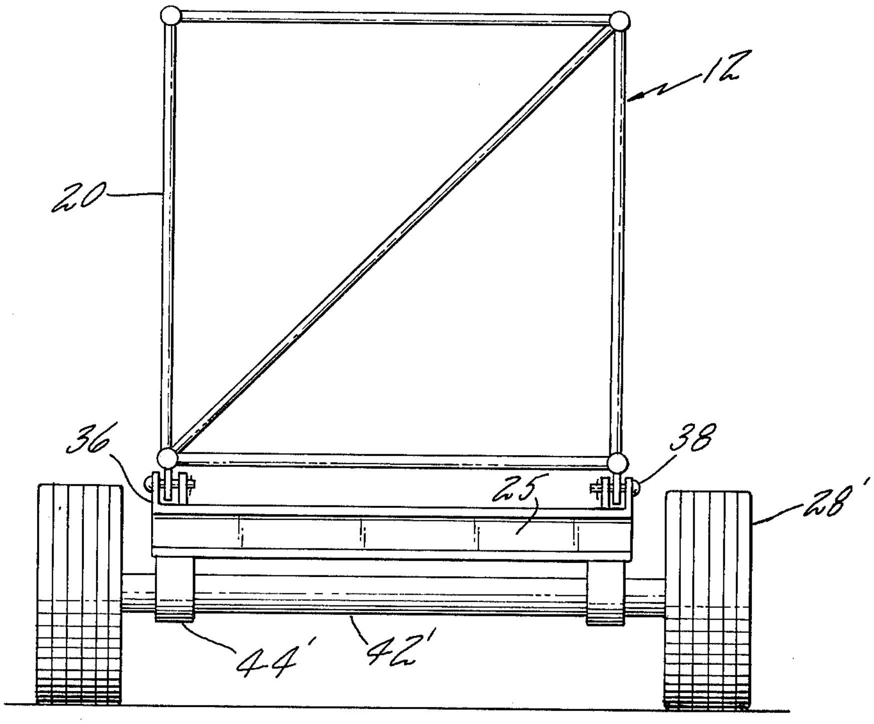
FIG. 2 is an end view, taken from the right as the apparatus is shown in FIG. 1, of a support assembly in accordance with the present invention with a crane boom positioned thereon.
Figure 3:
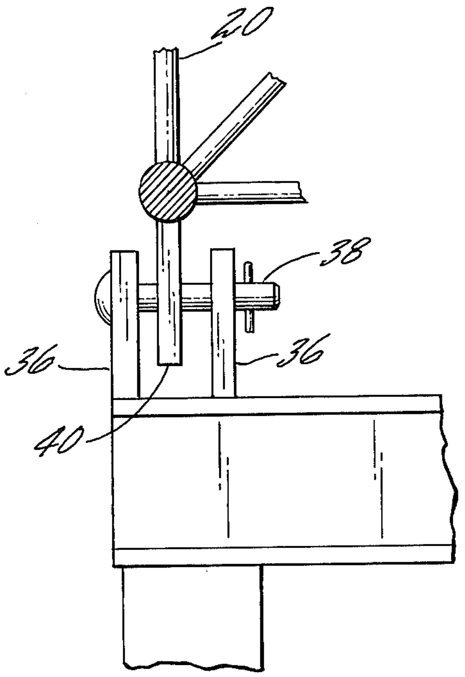
FIG. 3 is an enlarged view of the means for pivotally connecting a boom to the support assembly of FIGS. 1 and 2.

Referring to FIGS. 2 and 3, attachment means in the form of two pairs of parallel spaced plates 36 extend upwardly from frame end portion 25 adjacent the front end thereof. As may be seen from FIG. 1, the plates 36 are provided with aligned apertures which receive locking pins 38 which may, for example, be conventional folding link pins.

Continuing to refer to FIG. 3, the crane boom will be provided with at least a pair of apertured projections 40 which, with the boom supported on assembly 10, will be positioned between the pairs of plates 36. Thus, to secure the boom to the support assembly 10 the pins 38 need merely be inserted through the aligned apertures in the plates 36 and projections 40. The projections 40 will, of course, be aligned on opposite sides of the boom and the pins 38 will define a single axis about which relative pivoting action between the boom 12 and boom axle 10 may occur.

The apertured projections 40 will typically be in the form of plates welded to the boom 12. Other arrangements are, of course, possible. It may be possible to employ, as the means of attachment of the boom to the support assembly 10, apertured plates or similar devices which have been provided by the crane manufacturer as a point for attachment of the pendant cables 15. However, the support assembly of the present invention may be located at a variety of points dependent upon the tandem effect called for by the conditions, clearances, etc. Thus, if necessary or desirable, the plates 40 or similar devices may be permanently or temporarily affixed to the boom at a location or locations which is more appropriate than those cable attachment points provided by the manufacturer. It is particularly to be noted that no special rigging is required to attach the boom axle 10 to boom 12.

As desired or required by local regulation, the boom axle 10 may also include electrically or inertially operated road wheel brakes, hydraulic shock absorbers, additional axles for load distribution, dual wheels in the interest of enhanced cornering control and ability to move over unpaved terrain, lighting and fenders.

In one reduction to practice of the invention, wherein a ninety (90) foot boom was transported, the plates 40 on the boom were located at the intersection of the upper boom section 20 and a tip section 22. The distance between the center of the turntable of the crane cab and the plates 40 was approximately 36.8 feet. The appropriate distance between the center of the turntable and the plates 40 may, of course vary. The positioning of the axle or axles of the support assembly relative to the point of connection of the boom axle to the boom will also vary as a function of the control to be exercised over the boom. However, the wheels will be positioned rearwardly of the pivot axis defined by pins 38. This rearward positioning helps maintain the wheels on the ground as boom 12 bounces and thus increases control over lateral movement of the boom. Additionally, so long as contact is maintained between the wheels and the ground the shock absorbing means, including the springs 44 will help in preventing the build up of vertical motion in the boom. Continuing to discuss the example of the above-referenced 90 foot boom, the center line of the front wheel 28' was positioned 33 inches behind the forward end of a boom axle have a total length of 74 inches while the center line of the rear wheels 28 was 60 inches from the front end, i.e., the pivot axis, of the assembly.

In the use of the present invention the stresses on the pendant cables 15 are greatly reduced and, in fact, these cables may be left in the slackened state since most of the weight of the boom will be born by the boom axle 10. Additionally, bouncing of the boom is substantially reduced since the pendant cables are slackened and thus offer little spring and rebound. It is to be noted that in the case of extreme relative downward travel, as represented in FIG. 6, the pendant cables 15 may become tensioned. In any event, since the weight of the boom rests primarily on the boom axle 10, rather than pivoting from the crane turntable as is the case in stiff-legged transport, a principle cause of bounce is eliminated. Similarly, since the weight of the boom is unloaded from the crane turntable, use of the present invention substantially reduces wear in the turntable. By the same token, the weight which was previously borne by the rear axles of the carrier vehicle is transferred to the boom axle 10 thus reducing tire and other mechanical wear. Steering control is also restored since the normal weight will be imposed upon the front axle of the carrier vehicle. Since the boom may follow the crane carrier around corners, the boom will negotiate tighter spaces. That is, since it is controlled on a horizontal axis by attachment to the boom axle 10, the boom is not prone to sway when negotiating corners and thus the chance of property damage is minimized. It should further be noted that the swing lock is disengaged during transport in accordance with practice of the present invention and thus wear to the swing lock during transport is eliminated.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for providing support for an elongated crane boom during over-terrain movement thereof, the boom being attached at a first end to a vehicle, said apparatus comprising:

frame means, said frame means including a main body portion and an extendable forward portion;

at least a first wheel set, said wheel set being mounted from said frame means main body portion and including an axle, said first wheel set further including means resiliently coupling said axle to said frame means;

means affixed to said frame mean forward portion and defining a pivot axis which is parallel to and displaced from said wheel set axle; and means for detachably and rotatably coupling the boom to said pivot axis defining means intermediate the length of said boom whereby relative motion between a portion of said boom and said axle may occur.

2. The apparatus of claim 1 wherein said frame means has a rectangular shape and wherein said pivot defining means is positioned adjacent the forward end thereof in the direction of travel.

3. The apparatus of claim 2 further comprising:

guide means mounted on said frame means main body portion adjacent the end thereof disposed oppositely with respect to said extendable forward portion, said guide means extending upwardly to engage and direct a crane boom onto said frame means.

4. The apparatus of claim 3 further comprising:

shock absorbing means mounted on said frame means main body portion adjacent to said guide means, said shock absorbing means being positioned to be contacted by a crane boom supported on said apparatus.

5. The apparatus of claim 4 wherein said pivot defining means comprises:

means defining channels having a pair of apertured side walls, a pair of said channel defining means being affixed to and extending upwardly from said frame means forward portion, the apertures in the side walls of said channel defining means being aligned and defining an axis which is parallel to the axis of said axle.

6. The apparatus of claim 5 wherein said coupling means comprises:

apertured members extending from the crane boom; and lock pin means, said lock pin means extending through said channel defining means side wall apertures and said apertured members extending from the crane boom.

7. The apparatus of claim 1 wherein said pivot defining means comprises:

means defining channels having a pair of apertured side walls, a pair of said channel defining means being affixed to and extending upwardly from said frame means forward portion, the apertures in the side walls of said channel defining means being aligned and defining an axis which is parallel to the axis of said axle.

8. The apparatus of claim 7 wherein said coupling means comprises:

apertured members extending from the crane boom; and lock pin means, said lock pin means extending through said channel defining means side wall apertures and said apertured members extending from the crane boom.

9. The apparatus of claim 8 further comprising:

guide means mounted on said frame means main body portion adjacent the end thereof disposed oppositely with respect to said extendable forward portion, said guide means extending upwardly to engage and direct a crane boom onto said frame means.

10. The apparatus of claim 9 further comprising:

shock absorbing means mounted on said frame means main body portion adjacent to said guide means, said shock absorbing means being positioned to be contacted by a crane boom supported on said apparatus.

11. The apparatus of claim 10 wherein said frame means has a rectangular shape and wherein said pivot defining means is positioned adjacent the forward end thereof in the direction of travel.

* * * * *